Dec. 29, 1970     R. J. LEE     3,550,482
INTEGRAL CHAMFERING TOOL
Filed June 26, 1968
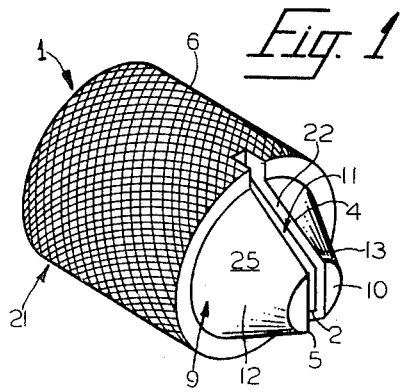
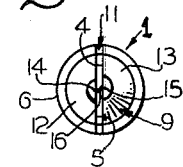
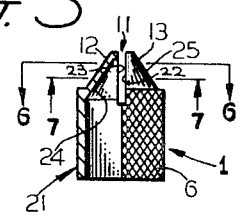
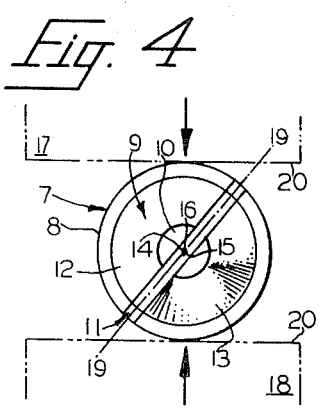
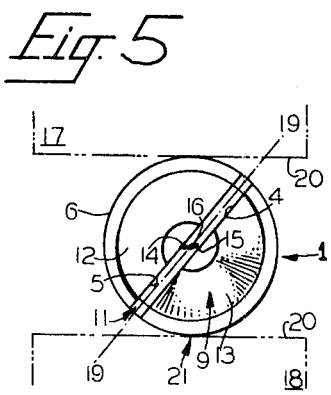
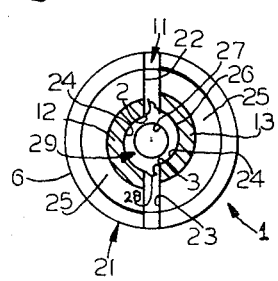
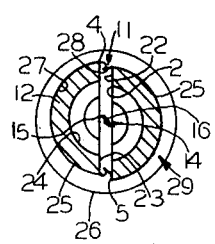
INVENTOR
RICHARD J. LEE
BY
DONALD E. PORTER
ATTORNEY

United States Patent Office 3,550,482
Patented Dec. 29, 1970

3,550,482
INTEGRAL CHAMFERING TOOL
Richard J. Lee, R.R. 2, Hartford, Wis. 53027
Filed June 26, 1968, Ser. No. 740,290
Int. Cl. B23d 79/08
U.S. Cl. 77—73     1 Claim

ABSTRACT OF THE DISCLOSURE

A tool for chamfering the end of a cartridge case or the cut end of a tube, comprising an integral hollow body having a non-cylindrical main body portion and a substantially coniform hollow end bisected by a diametrical slot, with the halves of such end being offset from each other so that the lines of intersection between the sides of such slot and the interior and exterior of such end form diametrically opposite interior and exterior cutting edges; and a method of making such tool.

---

Chamfering tools (which also are known as reamers) for tubing or hollow pipe are known in the art. An example of such a tool is shown in U.S. Pat. No. 3,232,145 which issued Feb. 1, 1966, to F. R. Wilson and is entitled "Hand Reamer." Ordinarily, such a tool is expensive to manufacture and assemble because, in order to provide cutting edges, separate cutting blades must be inserted in the tool to extend outwardly and inwardly therefrom; and blade supporting means must be provided in the tool for securing and supporting the blades therein. The cutting blades are adapted to be forced against the inside and outside peripheral walls of the tube and simultaneously rotated, so that the rotating blades cut burrs from and bevel the peripheral edges of the end of the tube.

Another form of reamer is machined from steel bar stock, after which the tool is heat treated and then the cutting edges are sharpened by grinding. Each such manufacturing operation is expensive, and the resulting tool has a tendency to "chatter" when used for reaming.

The present invention provides an improved integral chamfering tool for chamfering or reaming both the inner and outer surfaces of the cut end of a tubular body, such as a hollow tube or pipe or the mouth of an empty cartridge case. The tool includes an integral hollow body having a non-cylindrical main body portion and a coniform end, which is bisected by a diametrical slot extending therethrough. The lines of intersection between the sides of such slot and the interior and exterior surfaces of the coniform end provide cutting edges, by virtue of the fact that the halves of the end on opposite sides of the slot are substantially sections of right circular cones and the axes of such halves lie equidistantly on opposite sides of the axis of the non-cylindrical main body portion.

A chamfering tool thereby is provided which includes diametrically opposite exterior cutting edges, which are integral with the coniform end of the tool, and corresponding diametrically opposite cutting edges within the interior of the coniform end and integral therewith. When the exterior of the coniform end is forcibly inserted in the cut end of a tube and rotated, the exterior cutting edges thereof, by virtue of the angle of inclination of the walls of the halves of the coniform end of which they are integral parts, will chamfer, ream or bevel the periphery of the interior of the cut end at such angle. Similarly, when the interior of the coniform end is forcibly placed over the cut end of the tube and rotated, the interior cutting edges thereof will bevel the periphery of the exterior of the cut end. In either event, the tool does not tend to "chatter" because of the uniform clearance behind the tool's cutting edges due to the method of its manufacture.

The invention also provides an improved means of making such a chamfering tool, consisting of distorting the shape of an integral hollow body having a cylindrical main body portion and an end substantially in the shape of a right circular cone bisected by a diametrical slot through the vertex of the substantially conical end so as to cause the main body portion to assume a non-cylindrical shape, and so as to offset the axes of the halves of the substantially conical end on opposite sides of the slot equidistantly on opposite sides of the axis of the non-cylindrical main body portion.

The best mode presently contemplated of carrying out the invention is illustrated in the accompanying drawings in which FIG. 1 is a perspective view of a chamfering tool embodying the present invention, in which the offset of the halves of the substantially conical end has been shown in exaggerated form.

FIG. 2 is a plan view of the chamfering tool shown in FIG. 1.

FIG. 3 is an elevation view of the chamfering tool shown in FIG. 1, shown partially in section.

FIG. 4 is a plan view of an integral hollow body, having a cylindrical main body portion and a substantially conical end and diametrical slot, showing the lines of force to be exerted to distort the shape of the cylindrical main body portion in the process of the present invention.

FIG. 5 is a plan view of the chamfering tool produced by the process of the present invention, showing the non-cylindrical main body portion and the substantially coniform end, with the axes of the two halves thereof on opposite sides of the slot being offset from each other and from the axis of the non-cylindrical main body portion and with the offset being shown in exaggerated form.

FIG. 6 is a transverse sectional view of the chamfering tool shown in FIG. 3, substantially on line 6—6 thereof, disclosing the operation of the diametrically opposite interior cutting edges of the chamfering tool upon the outer peripheral edge of the cut end of a tube.

FIG. 7 is a transverse sectional view of the chamfering tool shown in FIG. 3, substantially on line 7—7 thereof, disclosing the operation of the diametrically opposite exterior cutting edges of the chamfering tool upon the inner peripheral edges of the cut end of a tube having an inside diameter substantially greater than that of the tube shown in FIG. 6.

While it is contemplated that the chamfering tool 1 may be fabricated from carbon steel, it is preferred that the material be a more free machine grade of steel which may be more easily worked by machine tools during the method hereinafter described and which, after the tool 1 has been distorted to its non-cylindrical shape, may be carbo-nitrided to a depth of, for example, .005 to .010 inch so as to harden the cutting edges, 2, 3, 4 and 5 of the tool 1.

It is also contemplated that the tool 1 may be made in a wide variety of sizes without departing from the invention. However, it is anticipated that the major proportion of the tools embodying the present invention will be made in relatively small sizes for use in hand-chamfering and reaming small diameter tubing and, particularly, the mouths of empty cartridge cases and the like. As a consequence, the exterior surface of the main body portion 6 of the tool 1 shown in the drawings is knurled so as to provide a non-slippery grip for the user's fingers.

As a preliminary step to the process of the invention, the integral hollow body 7 shown in FIG. 4 is fabricated by conventional machining methods so as to have a cylindrical hollow main body portion 8 and an end 9 formed on one end of the main body portion 8 substantially in the shape of a right circular cone. It is preferred that, without departing from the invention, the substantially conical end 9 be a frustum of a right circular cone (as shown in the drawings), in order to provide sufficient metal mass at the tip 10 of the end to lessen the likelihood of fracturing or burring of the tip 10 during the cutting of the slot 11 hereinafter described.

The substantially conical end 9 has a diametrical slot 11 cut through the vertex thereof so as to bisect the end 9 to define halves 12 and 13 thereof. Therefore, each of the halves 12 and 13 shown in the drawings is a section of a frustum of a right circular cone, or substantially a section of a right circular cone.

As the next step of the process of the invention, which is schematically illustrated in FIG. 4, the shape of the hollow body 7 is distorted so as to cause the main body portion 8 to assume a non-cylindrical shape and to dispose and offset the axes 14 and 15 of the halves 12 and 13 of the substantially conical end 9 equidistantly on opposite sides of the generally central axis 16 of the resulting non-cylindrical main body portion 6 in a direction parallel to the extent of slot 11. The substantially conical end 9 of the tool thereby is made generally coniform; that is, it has the appearance of a cone, but is not a true cone. Although various means for accomplishing such distortion are available, the inventor prefers that the main body portion 8 of the cylindrical body 7 be placed between the jaws 17 and 18 of a vise, with the body 7 turned so that the center plane 19 of the slot 11, if extended, would intersect the face 20 of each of the jaws 17 and 18 at an included angle of approximately fifty degrees. In order to obtain the desired distortion, the movable jaw 18 of the vise then is moved toward the other jaw 17 a distance in the range of .008 and .012 inch, which results in an offsetting of the axes 14 and 15 of the halves 12 and 13 of the coniform end 9 a distance of approximately .010 inch from each other and equidistantly on opposite sides of the axis 16 of the resulting non-cylindrical main body portion 6, and provides the desired diametrically opposite interior and exterior cutting edges 2, 3, 4 and 5.

The resulting tool 1 then comprises an integral hollow body 21 having a non-cylindrical main body portion 6 and a substantially coniform hollow end or point 9 which is bisected by a diametrical slot 11 extending through the coniform end 9 and in which the halves 12 and 13 of the coniform end 9 on opposite sides of the slot 11 may be described as being substantially sections of right circular cones, the axes 14 and 15 of which lie equidistantly on opposite sides of the axis 16 of the non-cylindrical main body portion 6. As a result, the lines of intersection between the sides 22 and 23 of the slot 11 and the interior and exterior surfaces 24 and 25 of the coniform end 9 define diametrically opposite integral interior cutting edges 2 and 3 and exterior cutting edges 4 and 5 which, as shown in FIGS. 6 and 7 which are exposed and, may be employed to bevel the outer and inner peripheral edges 26 and 27 of the cut end 28 of a tube 29.

Various modes for carrying out the invention are contemplated as being within the scope of the following claim particularly pointing out and distinctly claiming the subject matter which is regarded as the invention.

I claim:

1. A tool for chamfering the interior end portions of a tubular workpiece, comprising:
    (a) a hollow body,
    (b) and a cutting point for said body comprising a conical body end member bisected by a slot therein to form point halves provided with diametrically opposed exterior cutting slot edges for chamfering the interior end portions of a workpiece,
    (c) said point halves being hollow to provide diametrically opposed interior cutting slot edges for chamfering the exterior end portion of a workpiece,
    (d) said hollow body being generally cylindrical, but being distorted to non-cylindrical shape with a generally central axis, and
    (e) the axis of said point halves being offset from the axis of said hollow body in a direction parallel to the extent of said slot so that both said exterior and interior cutting slot edges are exposed for chamfering.

References Cited

UNITED STATES PATENTS 2,958,241   11/1960   Wahli _____ 77—73.5

FRANCIS S. HUSAR, Primary Examiner

U.S. Cl. X.R.

29—1.32